(12) United States Patent
Nalakath et al.

(10) Patent No.: US 10,715,650 B2
(45) Date of Patent: *Jul. 14, 2020

(54) DUAL-TRANSCEIVER WIRELESS CALLING

(71) Applicant: Bose Corporation, Framingham, MA (US)

(72) Inventors: Sharafuddeen Nalakath, Westborough, MA (US); David Kleinschmidt, Acton, MA (US); Pepin Torres, Waltham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,896

(22) Filed: Jul. 15, 2019

(65) Prior Publication Data
US 2019/0342437 A1 Nov. 7, 2019

Related U.S. Application Data

(63) Continuation of application No. 15/928,250, filed on Mar. 22, 2018, now Pat. No. 10,356,232.

(51) Int. Cl.
*H04R 5/033* (2006.01)
*H04M 1/60* (2006.01)
*H04R 1/10* (2006.01)

(52) U.S. Cl.
CPC ............ *H04M 1/6066* (2013.01); *H04R 1/10* (2013.01); *H04R 1/1091* (2013.01); *H04R 2201/107* (2013.01); *H04R 2420/07* (2013.01)

(58) Field of Classification Search
CPC .............................. H04M 1/6066; H04R 1/10
See application file for complete search history.

(56) References Cited

U.S. PATENT DOCUMENTS

| 8,660,055 B2* | 2/2014 | Ueda ...................... H04B 1/385 370/315 |
| 8,768,252 B2* | 7/2014 | Watson .................... H04R 5/02 455/41.2 |
| 2012/0155670 A1 | 6/2012 | Rutschman |

FOREIGN PATENT DOCUMENTS

EP 1715718 A2 10/2006

OTHER PUBLICATIONS

International Search Report and Written Opinon dated May 31, 2019 for International application No. PCT/US2019/023600, Bose Ref. OG-17-026-WO.

* cited by examiner

*Primary Examiner* — Tuan H Nguyen

(57) ABSTRACT

Various implementations include dual-transceiver wireless audio systems configured to forward call audio from a first wireless transceiver to a second wireless transceiver over a simple voice forward profile (SVFP) connection. In other implementations, a computer-implemented method is disclosed for controlling a dual-transceiver wireless calling system. In still other implementations, a wireless headphone system is configured to forward call audio from a first headphone to a second headphone over the SVFP connection.

14 Claims, 8 Drawing Sheets

DUAL-TRANSCEIVER WIRELESS CALLING

CROSS-REFERENCE TO RELATED APPLICATION

This application claims priority of U.S. patent application Ser. No. 15/928,250, filed on Mar. 22, 2018, the entire disclosure of which is incorporated herein by reference for all purposes.

TECHNICAL FIELD

This disclosure generally relates to wireless calling. More particularly, the disclosure relates to wireless audio systems, such as headphones or other wirelessly coupled audio systems having wireless transceivers, including a call audio forwarding module for controlling transmission of call audio and call control data between wireless transceivers.

BACKGROUND

Wireless electronic devices, including headphones and other wearable audio systems are becoming more commonplace. However, the user experience with these audio systems is limited by the inability of these systems to adapt to different environments and user experiences.

It has become commonplace to use devices employing point-to-point wireless communications technologies to create a personal area network in the vicinity of a user of personal electronic devices carried about by the user (referred to by some as a "piconet") to convey audio from one of those personal electronic devices to one or both ears of the user, as in the case of the playback of audio stored on an audio playing device to the user. It has also become commonplace to additionally convey audio from the user to one of those personal electronic devices, as in the case of cell phone in which the user engages in telephonic communication through such point-to-point wireless communications with that device. Among the forms of such point-to-point wireless communications being used for such purposes are those that conform to the widely used "Bluetooth" specification promulgated by the Bluetooth Special Interest Group of Bellevue, Wash.

Wireless communications conforming to the Bluetooth specification have been in use for some time to wirelessly convey two-way audio between cell phones and so-called "earpieces" that incorporate both an acoustic driver to output call audio to an ear of a user and a microphone to receive call audio from the mouth of the user. More recently, there has been a growing emergence of audio playing devices employing wireless communications conforming to the Bluetooth specification to wirelessly convey one-way audio from those devices to one or more acoustic drivers to output audio to one or both ears of a user.

Unfortunately, despite the growing acceptance of such point-to-point wireless communications for the conveying of audio between personal electronic devices, the point-to-point nature, the procedures required to securely establish wireless connections, and the conversions of audio between various analog and digital forms have presented various difficulties. Those difficulties include various impediments to providing call audio to both ears of a user and sharing the call audio with another user.

SUMMARY

All examples and features mentioned below can be combined in any technically possible way.

Various implementations include dual-transceiver wireless audio systems configured to forward call audio from a first wireless transceiver to a second wireless transceiver over a simple voice forward profile (SVFP) connection. In other implementations, a computer-implemented method is disclosed for controlling a dual-transceiver wireless calling system. In still other implementations, a wireless headphone system is configured to forward call audio from a first headphone to a second headphone over the SVFP connection.

In some particular aspects, a wireless audio system includes: a first wireless transceiver configured to establish a wireless link with an audio gateway for receiving and sending call audio and exchanging call control data; and a second wireless transceiver configured to wirelessly communicate with the first wireless transceiver over a simple voice forward profile (SVFP) connection, where the first wireless transceiver is configured to forward the call audio to the second wireless transceiver and exchange the call control data with the second wireless transceiver over the SVFP connection.

In other particular aspects, a computer-implemented method of controlling a wireless audio system having a first wireless transceiver, a second wireless transceiver and an audio gateway configured to send and receive call audio, and exchange call control data, over a wireless link between the first wireless transceiver and the audio gateway is disclosed. In these aspects, the method includes: establishing a simple voice forward profile (SVFP) connection between the first wireless transceiver and the second wireless transceiver; and forwarding, from the first wireless transceiver, the call audio received from the audio gateway to the second wireless transceiver over a synchronous connection-oriented (SCO) link established by the SVFP connection.

In additional particular aspects, a wireless headphone system includes: a first headphone having: at least one first microphone; and a first wireless transceiver connected with the at least one first microphone and configured to establish a wireless link with an audio gateway for receiving and sending call audio; and a second headphone having: at least one second microphone; and a second wireless transceiver connected with the at least one second microphone and configured to wirelessly communicate with the first wireless transceiver over a simple voice forward profile (SVFP) connection, where the first wireless transceiver is configured to forward the call audio to the second wireless transceiver over the SVFP connection.

Implementations may include one of the following features, or any combination thereof.

In certain implementations, the SVFP connection includes a dedicated radio frequency communication (RFCOMM) channel and a dedicated synchronous connection-orientated (SCO) link between the first wireless transceiver and the second wireless transceiver. In some cases, the first wireless transceiver is configured to receive and send call audio over the SCO link and exchange the call control data over the RFCOMM channel established by the SVFP.

In particular instances, the wireless audio system further includes a headphone system having a first headphone containing the first wireless transceiver and a second headphone containing the second wireless transceiver. In certain implementations, the first headphone further includes at least one first microphone and the second headphone further includes at least one second microphone, where the second wireless transceiver is configured to send call audio received at the at least one second microphone to the first wireless transceiver over a synchronous connection-orientated (SCO)

link established by the SVFP connection, and where the first wireless transceiver is configured to send the call audio received from the second wireless transceiver to the audio gateway over a synchronous connection-orientated (SCO) link established by a hands-free profile (HFP) connection. In some cases, the first headphone and the second headphone are configured to disable an on-ear detection operating mode during receipt or transmission of the call audio. In particular implementations, the SVFP connection permits the call audio and the call control data to travel exclusively over the SVFP connection between the first wireless transceiver and the second wireless transceiver, and the SVFP connection permits control of delay in playing the call audio by a digital signal processor (DSP) in at least one of the first headphone or the second headphone. In certain instances, the delay in playing the call audio by the DSP permits synchronization of playing the call audio by the DSP in the first headphone and the DSP in the second headphone.

In some implementations, the wireless audio system further includes an audio conference system paired with a headphone system, where the first wireless transceiver is contained in the audio conference system and the second wireless transceiver is contained in the headphone system.

In certain cases, the wireless link between the first wireless transceiver and the audio gateway, and a second wireless link between the first wireless transceiver and the second wireless transceiver, are over Bluetooth.

In particular instances, forwarding the call audio to the second wireless transceiver and exchanging the call control data with the second wireless transceiver over the SVFP connection does not involve a hands-free profile (HFP) connection between the first wireless transceiver and the second wireless transceiver.

In some implementations of a computer-implemented method, the SVFP connection is established in response to a hands-free profile (HFP) connection being established between the audio gateway and the first wireless transceiver, and the method further includes: exchanging the call control data between the first wireless transceiver and the second wireless transceiver over a radio frequency communication (RFCOMM) channel established by the SVFP connection.

In some cases, a service discovery protocol (SDP) server at the second wireless transceiver has a service record with generic audio as a major service class and simple voice forward as a minor service class, and specifies a custom universally unique identifier (UUID) on a service class identification (ID) list, forming a custom Bluetooth profile for the SVFP connection, and the SVFP connection is initiated by the first wireless transceiver by sending an SDP query to the second wireless transceiver with the custom UUID as a parameter, and upon receipt of the SDP query, the second wireless transceiver responds positively with an SDP response with a dedicated RFCOMM channel number as a parameter.

In certain instances, control of the delay in playing the call audio by the DSP includes exchanging delay information within call control data over a radio frequency communication (RFCOMM) channel established by the SVFP connection between the first wireless transceiver and the second wireless transceiver.

In particular implementations, the first headphone further includes a first digital signal processor (DSP) coupled with the first wireless transceiver and the second headphone further includes a second DSP coupled with the second wireless transceiver, and the first DSP and the second DSP are configured to synchronize playing the call audio at the first wireless transceiver and the second wireless transceiver by exchanging delay information as part of the call control data exchanged over the RFCOMM channel established by the SVFP connection.

Implementations may include one of the following features, or any combination thereof.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
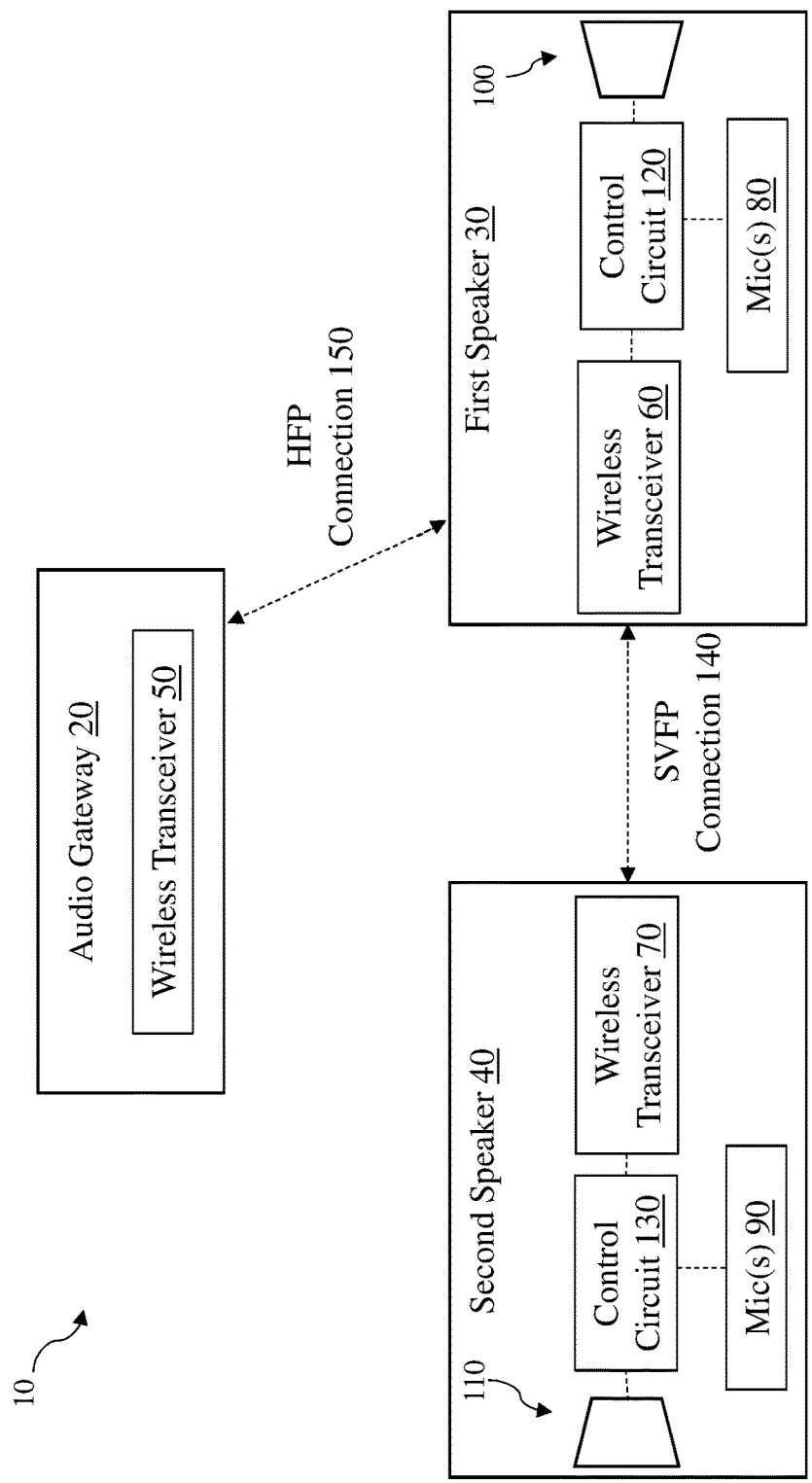
FIG. 1 is a block diagram depicting a wireless audio system according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a call audio forwarding module can be beneficially incorporated into a wireless audio system to provide for added functionality. For example, a wireless audio system can help to enable, among other things, call audio forwarding from a first wireless transceiver to a second wireless transceiver over a simple voice forward profile (SVFP) connection.

Commonly labeled components in the FIGURES are considered to be substantially equivalent components for the purposes of illustration, and redundant discussion of those components is omitted for clarity.

Aspects and implementations disclosed herein may be applicable to a wide variety of wireless audio systems, such as a portable speaker, headphones, and wearable audio devices in various form factors, such as glasses, neck-worn speakers, shoulder-worn speakers, body-worn speakers, etc.

Unless specified otherwise, the term headphone, as used in this document, includes various types of personal audio systems such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as shoulder or body-worn acoustic devices that include one or more acoustic drivers to produce sound without contacting the ears of a user. It should be noted that although specific implementations of personal audio devices primarily serving the purpose of acoustically outputting audio (e.g., call audio) are presented with some degree of detail, such presentations of specific implementations are intended to facilitate understanding through provision of examples, and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

Example configurations of a wireless audio system include an audio gateway capable of making and receiving phone calls (e.g., a cellular phone, personal data assistant (PDA), tablet, personal computer (PC), wearable communication system, or any other known audio gateway for initiating and/or receiving phone calls). The audio gateway can be paired with a set of wireless transceivers, which can include wirelessly connected headphones, earbuds, wearable audio devices, audio conference system(s), smart speakers, etc. In the example of a headphone system such as a wireless earbud headphone system, the wireless transceivers are wirelessly linked with the audio gateway (and each other) in order to perform call-related functions (e.g., receive/send call audio).

As used herein, the term "call audio" refers to analog audio received on microphone(s), or digital form of the audio which is transferred in encoded format through the audio channel between the audio gateway and the first wireless transceiver or between the first wireless transceiver and the second wireless transceiver. As additionally used herein, the term "call control data" refers to data that is used to configure and control various parameters of the call functionality, which is transferred through the data channel between the audio gateway and the first wireless transceiver or between the first wireless transceiver and the second wireless transceiver.

In some wireless audio systems, call audio is not forwarded from the first wireless transceiver (or primary transceiver) to second or subsequent wireless transceivers (e.g., a second wireless transceiver). In these cases, the call audio is only played at the location of the first wireless transceiver (e.g., the first headphone or earbud). Some other wireless audio systems attempt to deliver call audio to the second wireless transceiver by performing so-called wireless "snooping," where the second wireless transceiver establishes a secondary wireless link with the audio gateway to mirror transmission between the audio gateway and the first wireless transceiver.

Some other wireless audio systems make a hands-free profile (HFP) connection between the first wireless transceiver and the second wireless transceiver to transfer audio received on the first wireless transceiver from the audio gateway into the second wireless transceiver. However, this solution inhibits effective synchronization between the audio played at the first wireless transceiver and the second wireless transceiver because HFP does not inherently support synchronization.

In contrast to these systems, various implementations as described herein include a wireless audio system configured to forward call audio from a first wireless transceiver to a second wireless transceiver and exchange call control data with the second wireless transceiver over a customized simple voice forward profile (SVFP) connection.

FIG. 1 is a block diagram of a wireless audio system 10 according to various implementations of the disclosure. The wireless audio system 10 includes an audio gateway 20, a first speaker 30 and a second speaker 40. The specific configuration of the audio gateway 20 and each of the speakers 30 and 40 can vary based upon the particular application of the various implementations disclosed, which may have any one of several forms. The audio gateway 20 may be implemented as any device capable of receiving a phone call, and can include one of a mobile phone, a portable game player, a portable media player, a smart speaker system, a computer (e.g., PC or tablet), an audio/video (A/V) receiver as part of a home entertainment or home theater system, etc.

The speakers 30 and 40 can take the form of any wireless speaker system, including, e.g., a headphone system or an audio conference system. In some cases, as described herein, speakers 30 and 40 can be part of distinct wireless speaker systems, such as where first speaker 30 is contained in a wireless headphone system and second speaker 40 is contained in an audio conference system. In other particular implementations, speakers 30 and 40 are part of a single wireless speaker system, such as a pair of wireless earbuds. In any case, speakers 30, 40 can each include a conventional speaker housing, e.g., a stand-alone speaker casing, headphone casing, earbud casing, or can be housed within a larger component such as a computer or A/V receiver, and can include any type of conventional electro-acoustic transducers. Speaker 30 may be a left channel speaker and speaker 40 may be a right channel speaker, or vice-versa, in which either speaker may be configured for either stereo channel.

The audio gateway 20, and speakers 30, 40 each have a wireless transceiver for sending and receiving wireless communications. In particular implementations, each wireless transceiver (comprising a transmitter and a receiver) can include, for example, a Bluetooth (BT) or Bluetooth Low Energy (BLE) transceiver or other conventional transceiver device, and may be configured to communicate with other transceiver devices as described herein. The audio gateway 20 can include a gateway (wireless) transceiver 50, first speaker 30 can include a first (wireless) transceiver 60 and second speaker 40 can include a second (wireless) transceiver 70.

In some implementations, each of the speakers 30, 40 can further include at least one microphone (first microphone(s) 80, second microphone(s) 90) for receiving call audio from a user and/or performing noise reduction functions as described herein. In various implementations, such as in the case of a headphone system, the microphone(s) 80, 90 can include one or more internal microphones (inner microphones) disposed within a cavity for surrounding the user's ear. In some cases, the microphone(s) 80, 90 can further include an outer microphone disposed in a manner that permits acoustic coupling to the environment external to the speaker 30, 40.

In implementations that include active noise reduction (ANR), the inner microphone may be a feedback microphone and the outer microphone may be a feedforward microphone. In such implementations, each earphone speaker 30, 40 includes an ANR circuit that is in communication with the inner and outer microphones. The ANR circuit can receive an inner signal generated by the inner microphone and an outer signal generated by the outer microphone, and perform an ANR process for the corresponding speaker 30, 40. The process includes providing a signal to electroacoustic transducers (e.g., speakers) 100, 110 disposed in the cavity around the ear to generate an anti-noise acoustic signal that reduces or substantially prevents sound from one or more acoustic noise sources that are external to the speaker 30, 40 from being heard by the user. As described herein, in addition to providing an anti-noise acoustic signal, the electroacoustic transducers 100, 110 can utilize its sound-radiating surface for providing an audio output for playback, e.g., for providing call audio at both of the speakers 30, 40.

According to some implementations, each of the speakers 30, 40 can further include a control circuit (first control circuit 120, second control circuit 130) including a microcontroller or processor having a digital signal processor (DSP). The respective control circuits 120, 130 can communicate with transceivers 60, 70 and microphone(s) 80, 90, as well as with the electroacoustic transducers 100, 110 to control the audio output to the user. In certain examples, the control circuits 120, 130 can convert inner signals from the inner microphones and/or the outer signals from outer microphones to digital format by analog to digital converters. In response to the received inner and/or outer microphone signals, the control circuit(s) 120, 130 can take various actions. For example, audio playback may be initiated, paused or resumed, a notification to a wearer may be provided or altered, and a device in communication with the wireless audio system 10 may be controlled.

The wireless audio system 10 can also include a power source. In some cases, the control circuit 120, 130 and power source may be located in one or both of the speakers 30, 40 or may be in a separate housing in communication with the speakers 30, 40. As noted herein, the speakers 30, 40 can communicate with the audio gateway 20 and/or other devices via wireless transceivers 60, 70, which may be contained within a network interface (e.g., employing a wireless communication protocol such as IEEE 802.11, Bluetooth, Bluetooth Low Energy, or other local area network (LAN) or personal area network (PAN) protocols such as WiFi). In particular implementations, as noted herein, wireless transceivers 60, 70 are particularly suited to communicate with the wireless transceiver 50 at audio gateway 20 via Bluetooth.

In operation, streamed data can pass from the network interface (e.g., wireless transceivers 60, 70) to the control circuit(s) 120, 130, including the processor or microcontroller. The control circuit(s) 120, 130 can execute instructions (e.g., for performing, among other things, digital signal processing, decoding, and equalization functions), including instructions stored in a corresponding memory (which may be internal to control circuit(s) 120, 130 or accessible via the network interface or other network connection (e.g., cloud-based connection)). The control circuit(s) 120, 130 may be implemented as a chipset of chips that include separate and multiple analog and digital processors. The control circuit(s) 120, 130 may provide, for example, for coordination of other components of the wireless audio system 10, such as control of user interfaces (not shown) and applications run by the wireless audio system 10. In various implementations, control circuit(s) 120, 130 include a call audio forwarding module (or modules), which can include software and/or hardware for performing call forwarding processes described herein. For example, control circuit(s) 120, 130 can include a call audio forwarding module in the form of a software stack having instructions for controlling call audio functions, connection functions and audio functions according to any implementation described herein.

In addition to a processor and/or microcontroller, control circuit(s) 120, 130 can also include one or more digital-to-analog (D/A) converters for converting the digital audio signal to an analog audio signal. This audio hardware can also include one or more amplifiers which provide amplified analog audio signals to the electroacoustic transducer(s) 100, 110, which each include a sound-radiating surface for providing an audio output for playback. In addition, the audio hardware may include analog-to-digital (A/D) circuitry for processing analog input signals to provide digital audio signals for sharing with other devices.

The memory in control circuit(s) 120, 130 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit(s) 120, 130), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit(s) 120, 130 (e.g., memory, or memory on the processor/microcontroller) can include a control module including instructions for controlling call audio forwarding functions according to various particular implementations. It is understood that portions of the control module (e.g., instructions) could also be stored in a remote location or in a distributed location, and could be fetched or otherwise obtained by the control circuit(s) 120, 130 (e.g., via any communications protocol described herein) for execution. The instructions may include instructions for controlling call audio forwarding functions (i.e., the software modules include logic for processing inputs audio gateway 20, first speaker 30 and second speaker 40), as well as digital signal processing and equalization. Additional details may be found in U.S. Patent Application Publication 20140277644, U.S. Patent Application Publication 20170098466, and U.S. Patent Application Publication 20140277639, the disclosures of which are incorporated herein by reference in their entirety.

In operation, wireless audio system 10 is configured to control forwarding of call audio from first transceiver 60 to second transceiver 70 over a simple voice forward profile (SVFP) connection 140. In various particular implementations, wireless audio system 10 is configured to initiate the SVFP connection 140 between the first transceiver 60 and the second transceiver 70 in response to a hands-free profile (HFP) connection 150 being established between the audio gateway 20 and the first transceiver 60. As described herein, after the SVFP connection 140 is established between the first transceiver 60 and the second transceiver 70, the first transceiver 60 is configured to forward the call audio to the second transceiver 70 as well as exchange call control data with the second wireless transceiver 70 over the SVFP connection 140.

Figure 2:
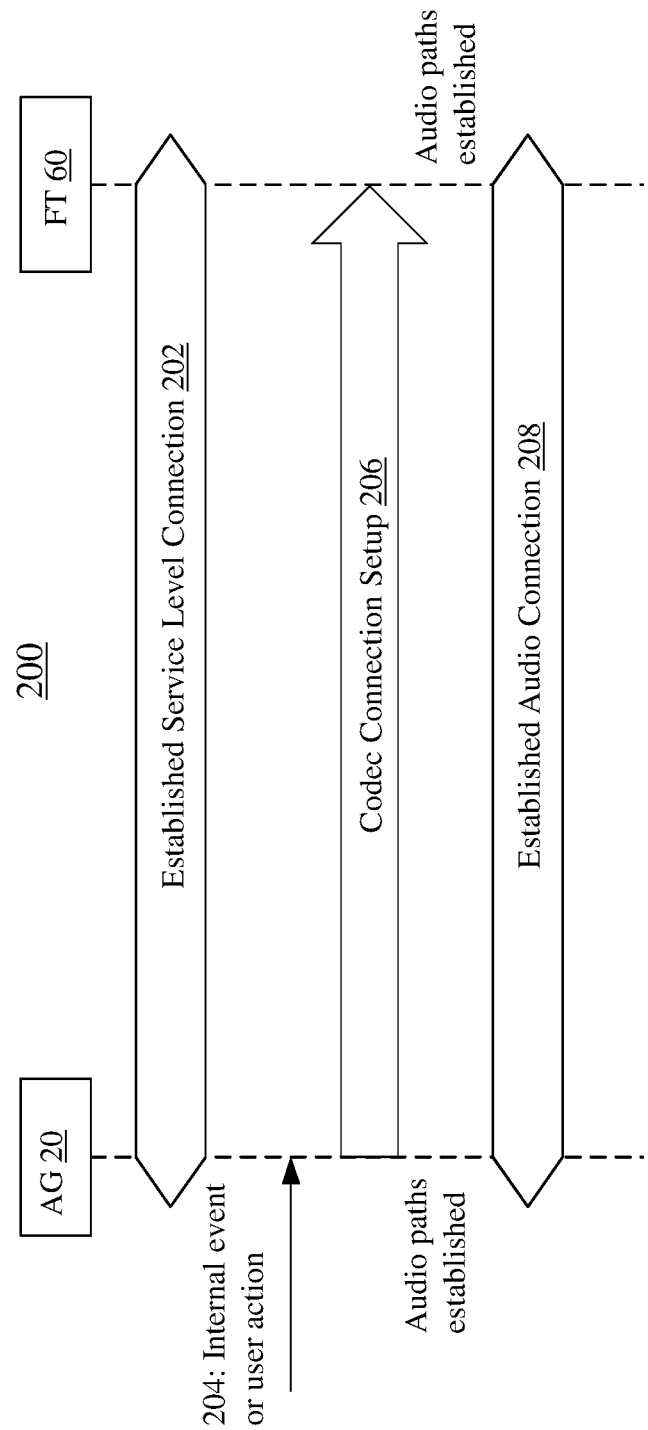
FIG. 2 is a flow diagram illustrating processes in forming an HFP audio connection between an audio gateway and a first transceiver in the system of FIG. 1.

FIG. 2 is a flow diagram 200 illustrating processes in forming HFP connection 150 between the audio gateway (AG) 20 (gateway transceiver 50) and the first transceiver (FT) 60 (FIG. 1) over Bluetooth. As described herein, this HFP connection 150 can be a pre-requisite to establishing the SVFP connection 140, such that control circuit 120 is configured to initiate the SVFP connection 140 after successfully completing the HFP connection 150 between the audio gateway 20 and the first speaker 30. Generally, this conventional HFP connection 150 is formed by a number of processes. For example, a service level connection 202 between the audio gateway 20 and the first transceiver 60 is established. Next, an internal event or user action 204 can trigger a codec connection setup 206 between the audio gateway 20 and the first transceiver 60. Finally, after the codec connection setup 206, audio connection 208 is established between the audio gateway 20 and the first transceiver 60. The audio connection 208 permits audio paths between audio gateway 20 and first transceiver 60, as is known in the art. Additional details of establishing a conventional HFP connection can be found in Hands-Free Profile Specification version 1.7, which is hereby incorporated by reference in its entirety.

Figure 3:
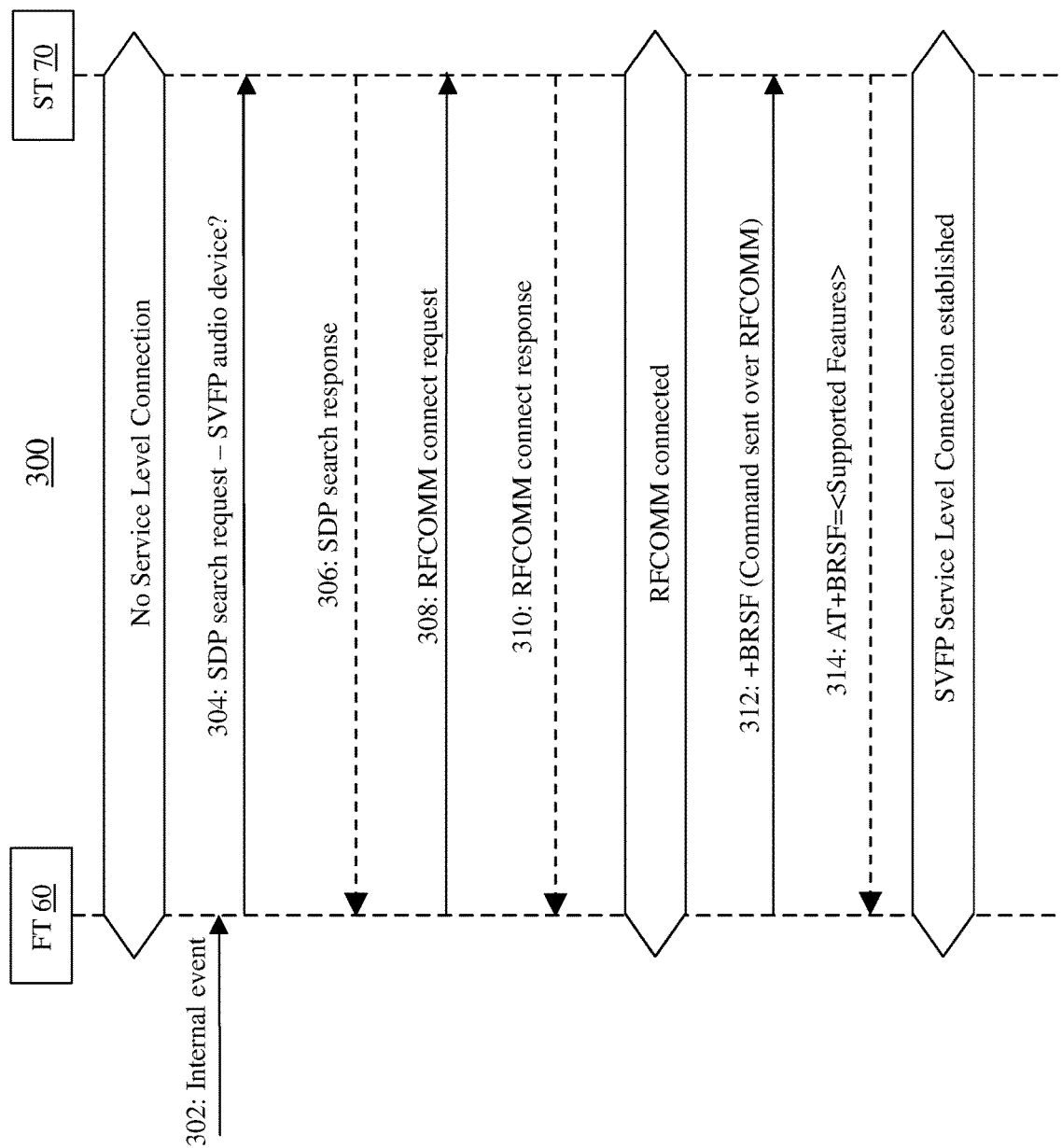
FIG. 3 is a flow diagram illustrating processes in forming a simple voice forward protocol (SVFP) service level connection between wireless transceivers in the system of FIG. 1.

As noted herein, the HFP connection 150 is a pre-requisite for SVFP connection 140 (FIG. 1) in various implementations. FIG. 3 is a flow diagram 300 illustrating some processes in forming the SVFP connection 140 between the first transceiver 60 and the second transceiver 70 (FIG. 1), after successfully establishing HFP connection 150. As with the HFP connection 150 between audio gateway 20 and first transceiver 60, the SVFP connection 140 between first transceiver 60 and the second transceiver 70 can be made over Bluetooth. Processes in establishing the SVFP connection 140 can include establishing both an SVFP service level connection and an SVFP audio connection. In various implementations, these processes are performed sequentially.

According to some implementations, the SVFP connection 140 is initiated by the first transceiver 60 and accepted by the second transceiver 70. This SVFP connection 140 allows the initiator of the SVFP service level connection to act as the acceptor of the SVFP audio connection, and vice versa. Further, the acceptor of one of the SVFP connections can terminate that connection. It is understood that the SVFP connection could also be initiated by the second transceiver 70, and accepted by the first transceiver 60, according to various other implementations.

In various implementations, the SVFP service level connection establishes an RFCOMM channel between the first transceiver 60 and the second transceiver 70. A pre-requisite for this connection is that the transceivers 60, 70 should be connected at a link manager (LM) link level. This connection may be established by exchanging Link Manager Protocol (LMP) commands between the first transceiver 60 and the second transceiver 70. Processes performed in establishing the SVFP service level connection, and illustrated in flow diagram 300 of FIG. 3, can include:

Process 302: an internal event occurs at the first transceiver 60, initiating the service level connection process. In some cases, this internal event can be the establishment of an HFP service level connection between the audio gateway 20 and the first transceiver 60.

Process 304: first transceiver 60 sends an SDP search request (query) to the second transceiver 70 to determine whether that second transceiver 70 is an SVFP audio device.

Process 306: The second transceiver 70 responds affirmatively, indicating an ability to connect over an RFCOMM channel, and identifying the second transceiver 70 as an SVFP audio device.

Process 308: first transceiver 60 sends an RFCOMM connection request to second transceiver 70.

Process 310: second transceiver 70 sends an affirmative RFCOMM connection response, resulting in an RFCOMM connection.

Process 312: first transceiver 60 sends a Bluetooth request support features (BRSF) request to determine which Bluetooth features are supported by second transceiver 70. This BRSF (Bluetooth Retrieve Supported Features) request can be transmitted over the established RFCOMM connection.

Process 314: second transceiver 70 sends AT command response to the AT command request, indicating BRSF supported features to first transceiver 60, and the SVFP service level connection is established. This BRSF AT command response can be transmitted over the established RFCOMM connection.

In various implementations, second transceiver 70 includes a service discovery protocol (SDP) server with a service record. The service record can indicate generic audio as a major service class and simple voice forward or similar unique name as a minor service class. Additionally, this service record can specify a custom universally unique identifier (UUID) on a service class identification (ID) list, forming the basis for a custom Bluetooth profile for the SVFP connection.

In some particular cases, the SVFP connection is initiated by the second transceiver 70. In these cases, the second transceiver 70 sends an SDP query to the first transceiver 60 with the custom UUID as a parameter, and upon receipt of the SDP query, the first transceiver 60 responds positively with an SDP response with a dedicated RFCOMM channel number as a parameter.

Figure 4:
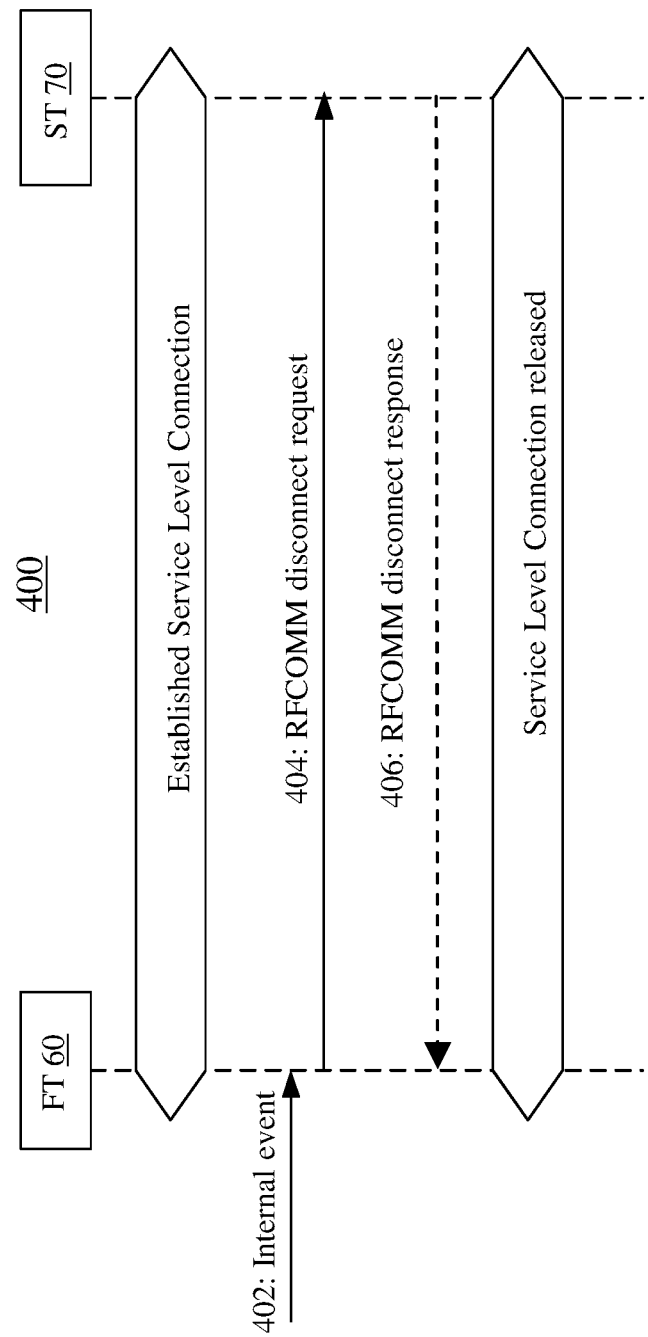
FIG. 4 is a flow diagram illustrating processes in disconnecting the SVFP service level connection between wireless transceivers established in the process of FIG. 3.

FIG. 4 is a flow diagram 400 illustrating processes in releasing the SVFP service level connection established by processes in flow diagram 300 (FIG. 3), according to various implementations. This process can include:

Process 402: an internal event occurs at the second transceiver 70, initiating the service level release process. In some cases, this internal event can be the release of HFP service level connection between the first transceiver 60 and the second transceiver 70.

Process 404: the first transceiver 60 sends an RFCOMM disconnect request to the second transceiver 70.

Process 406: the second transceiver 70 sends an RFCOMM disconnect response to the first transceiver 60, and the SVFP service level connection is released.

While illustrated as first transceiver 60 initiating the release, it is understood that the service level connection release may be initiated by either of the transceivers 60, 70, e.g., where there is an internal condition at the respective transceiver 60, 70 driving that release, such as release of HFP service level connection between the audio gateway 20 and the first transceiver 60, upon which the first transceiver 60 initiates a service level disconnection, or second transceiver 70 has a higher priority service to be carried out that demands the service level connection to be terminated, upon which the second transceiver 70 initiates the service level disconnection.

Figure 5:
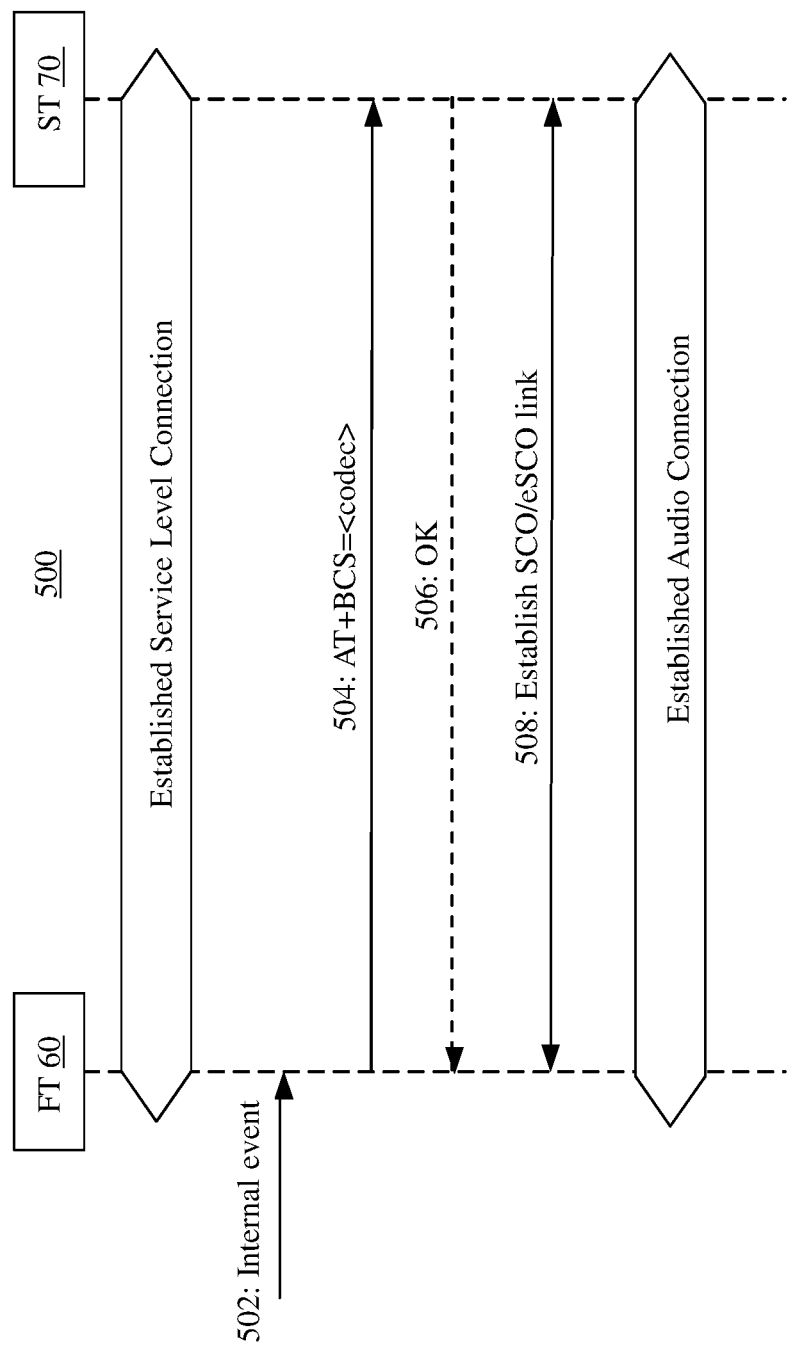
FIG. 5 is a flow diagram illustrating establishment of an SVFP audio connection between wireless transceivers in the system of FIG. 1.

FIG. 5 is a flow diagram 500 illustrating processes in forming the SVFP audio connection between the first transceiver 60 and the second transceiver 70. As noted herein, the processes illustrated in FIG. 5 can necessarily follow the SVFP service level connection illustrated in the flow diagram 300 of FIG. 3, such that the service level connection is a pre-requisite for the audio connection. The SVFP audio connection between transceivers 60, 70 involves sharing codec information, loading a codec plugin (if required), and establishment of a dedicated synchronous connection-orientated (SCO) link (or extended synchronous connection-oriented (eSCO) link) to carry encoded audio packets. The SVFP audio connection can be initiated by either transceiver 60, 70, however, the example of FIG. 5 shows the first transceiver 60 as initiator. As shown, SVFP audio connection processes can include:

Process 502: an internal event occurs at the first transceiver 60, initiating the SVFP audio connection process. In some cases, this internal event can be the establishment of HFP audio connection between the audio gateway 20 and the first transceiver 60.

Process 504: first transceiver 60 sends an AT command request BCS (Bluetooth Codec Selection) to the second transceiver 70.

Process 506: second transceiver 70 sends a confirmation (OK) indicating it received the AT command from first transceiver 60 and the required codec is supported.

Process 508: the SCO link between transceivers 60, 70 is established, resulting in an audio connection between those transceivers.

Figure 6:
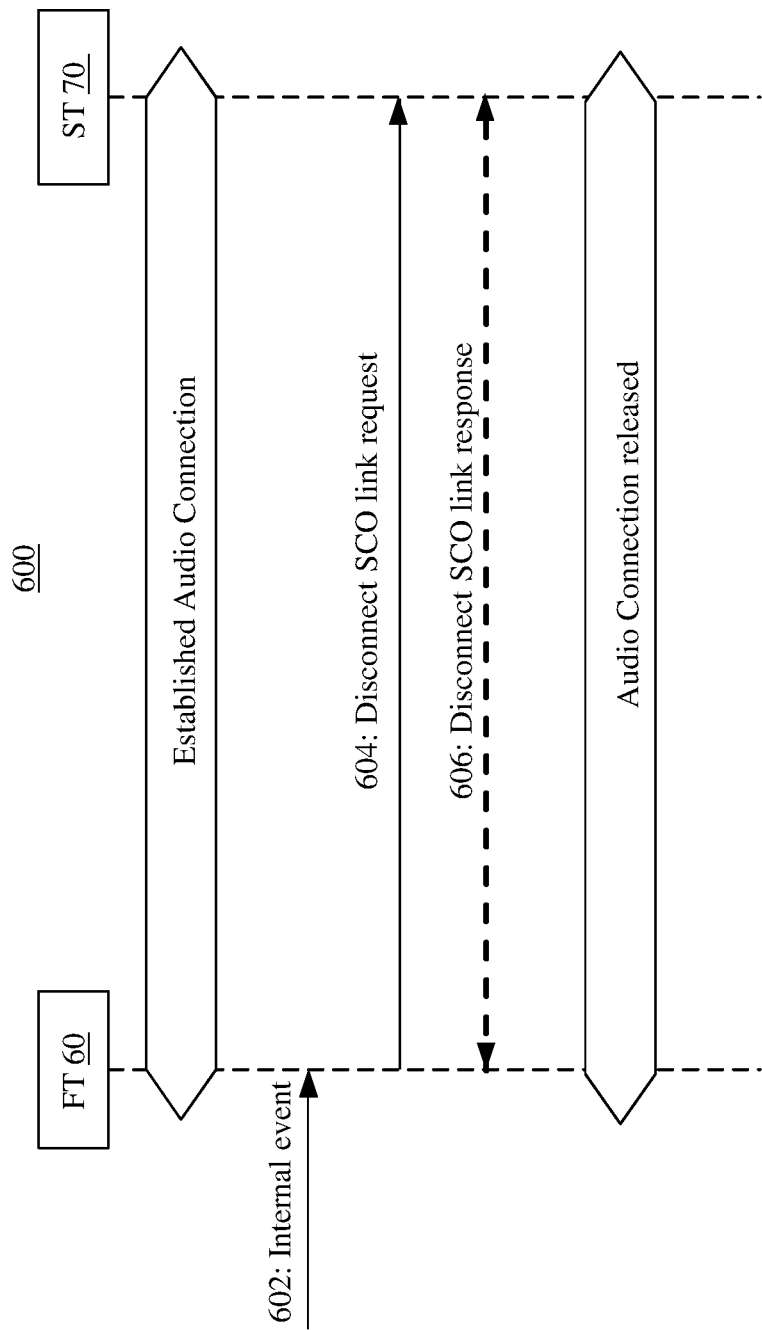
FIG. 6 is a flow diagram illustrating processes in disconnecting the SVFP audio connection between wireless transceivers established in the process of FIG. 5.

As with the service level connection, the audio connection between transceivers 60, 70 can also be released according to a sequence. Release of this audio connection can be performed by either transceiver 60, 70, however, the example process shown in flow diagram 600 in FIG. 6 is initiated by the first transceiver 60. This process can include:

Process 602: an internal event occurs at the first transceiver 60, initiating the audio connection release process. This internal event can be the release of audio connection between the audio gateway 20 and the first transceiver 60.

Process 604: the first transceiver 60 sends an SCO link disconnect request to the second transceiver 70.

Process 606: the second transceiver 70 sends an SCO link disconnect response, releasing the audio connection.

Returning to FIG. 1, when the SVFP connection 140 (including both service level and audio connection) is established between the first transceiver 60 and the second transceiver 70, the first transceiver 60 is configured to forward the call audio to the second transceiver 70, as well as exchange call control data between the transceivers 60, 70 over that SVFP connection 140. As noted herein, in some implementations, this SVFP connection 140 includes a dedicated RFCOMM channel and a dedicated SCO link between the transceivers 60, 70.

Additionally, the HFP connection 150 between the first transceiver 60 and the audio gateway 20 permits the first transceiver 60 to exchange call audio and call control data with the audio gateway 20 over an SCO link. However, according to various embodiments, forwarding the call audio to the second wireless transceiver 70 and exchanging the call control data with the second wireless transceiver 70 over the SVFP connection 140 does not involve a hands free profile (HFP) connection (e.g., HFP connection 150) between the first wireless transceiver 60 and the second wireless transceiver 70. As opposed to utilizing a conventional HFP connection between the transceivers 60, 70, this SVFP connection 140 is customized for audio forward functionality and hence it does not consume as many resources as an HFP connection would. Moreover, the SVFP profile is customizable, and has a mechanism for synchronization of playing of audio in first speaker 30 and second speaker 40, which is not inherently provided by the HFP profile.

With continuing reference to FIG. 1, as noted herein, the wireless audio system 10 includes a headphone system in some particular implementations. In these cases, at least one of the speakers 30, 40 can include headphones, which can include wireless headphones such as earbuds or wireless on-ear, over-ear or otherwise wearable headphones. It is also possible that the speakers 30, 40 in these implementations can include any other personal audio device described herein. In particular implementations, each of the speakers 30, 40 can include one or more microphones 80, 90 for receiving call audio from the user. In some cases, second speaker 40 (with second transceiver 70 and second microphone(s) 90) is configured to receive call audio from the user and send that call audio to the first speaker 30 (with first transceiver 60) over the SCO link established by the SVFP connection 140. First speaker 30 (with first transceiver 60) is configured to then send that call audio from the second speaker 40 to the audio gateway 20 over the SCO link established by the HFP connection 150.

In various particular implementations, the speakers 30, 40 are configured to be physically separated and utilized by distinct users or groups of users. That is, where speakers 30, 40 include earbuds or other headphones, one of the speakers 30, 40 could be removed from the user and transferred to another user, e.g., for call sharing. In this case, each of the speakers 30, 40 can independently receive call audio from the same or distinct users. In one example scenario, distinct users can discretely participate on a conference call, such that one user can both send and receive call audio at the first speaker 30 and another user can both send and receive call audio at the second speaker 40. In this case, the speakers 30, 40 can include additional sensors for detecting an operating mode of the speaker 30, 40. For example, the speakers 30, 40 can include sensors coupled with the control circuit 130 for performing on-ear detection (as well as head tracking), to determine whether an earbud or other headphone is on the user's ear. The on-ear detection mechanism can include any conventional on-ear detection approach, utilizing one or more sensors such as a motion detector, gyroscope, accelerometer, etc. In certain cases, the control circuit 120, 130 is configured to disable the on-ear detection operating mode of the speaker 30, 40 during receipt or transmission of the call audio. This control mechanism can allow a user to share the call audio experience with another user, e.g., by sharing a speaker with that user without interruption from the on-ear detection mechanism.

As noted herein, the SVFP connection 140 between the first transceiver 60 and the second transceiver 70 permits call audio and call control data to travel exclusively over that connection between the transceivers 60, 70. This SVFP connection 140 can also permit control of delay in playing the call audio by the DSP (in control circuits 120, 130) in one or both speakers 30, 40. Delay control can include exchanging delay information within call control data over the RFCOMM channel established by the SVFP connection 140 between the first transceiver 60 and the second transceiver 70. This delay control permits synchronization in playing the call audio at the respective speakers 30, 40. Controlling this delay and synchronization in call audio between speakers 30, 40 can provide benefits relative to conventional speaker connections, because if the speakers are connected over a conventional HFP connection instead of SVFP connection, the HFP connection does not provide an inherent mechanism to synchronize the playing of voice on the speakers.

Figure 7:
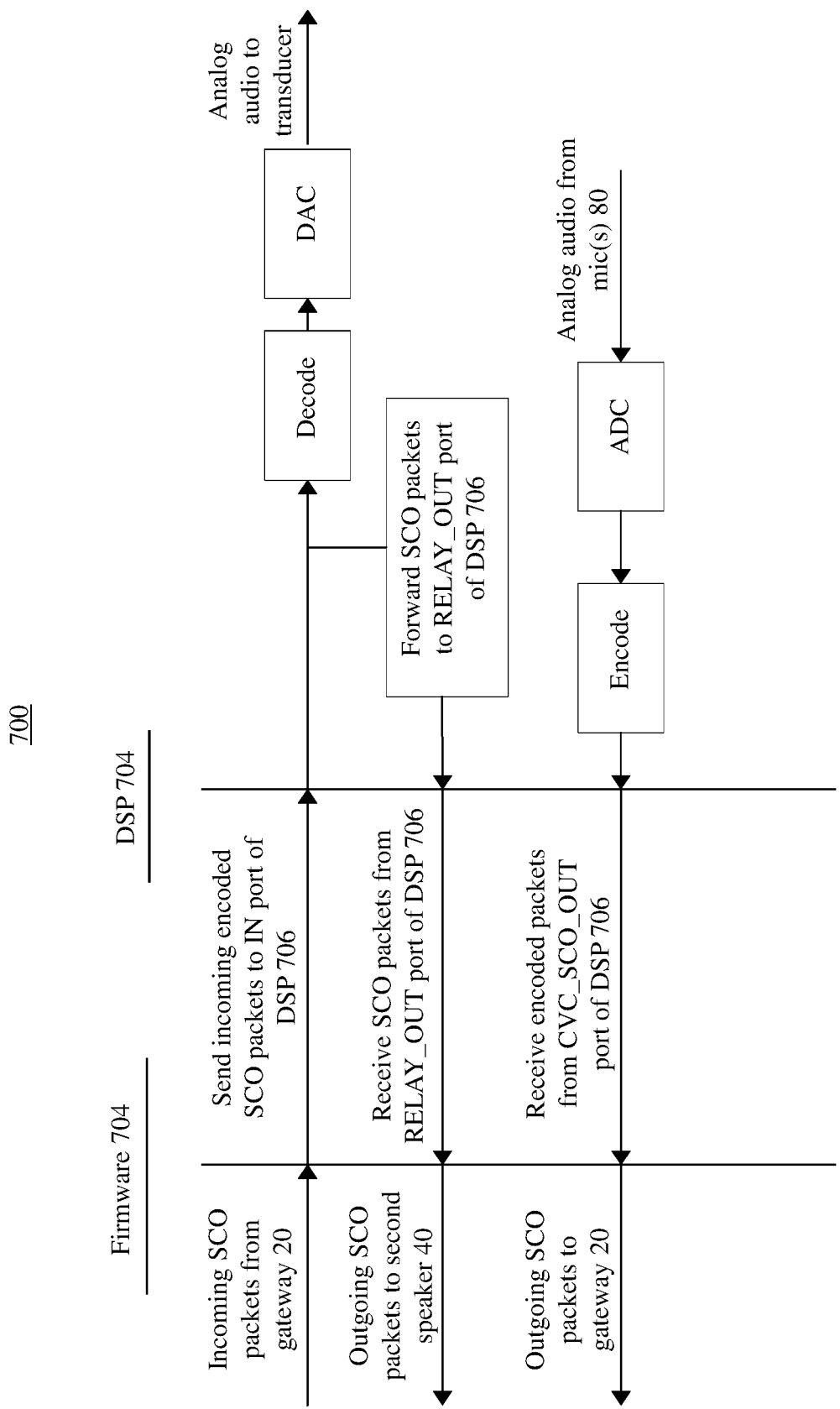
FIG. 7 is example data flow diagram illustrating data paths at the first speaker relative to the audio gateway and second speaker in the wireless audio system of FIG. 1, after establishment of the SVFP connection.

FIG. 7 is an example data flow diagram 700 illustrating data paths at the first speaker 30 (primary speaker) relative to the audio gateway 20 and second speaker 40 in wireless audio system 10 after establishment of the SVFP connection 140. As shown, the first speaker 30 receives incoming SCO packets from the audio gateway 20 over the SCO link established by the HFP connection 150. Firmware 704 at the first speaker 30 streams the encoded SCO packets to the IN port of the DSP 706 (in control circuit 120). As noted herein, in contrast to other systems, wireless audio system 10 is configured to forward audio from first speaker 30 to second speaker 40. That is, as shown in FIG. 7, prior to decoding the SCO packets received at the IN port, the DSP 706 routes those (raw, un-decoded) SCO packets to its RELAY OUT port back to the firmware 704, where the raw SCO packets are sent to the second speaker 40 over the SCO link established by the SVFP connection 140. Additionally, the raw SCO packets received at the IN port of the DSP 706 are decoded and converted (digital-to-analog conversion) to provide analog audio to the transducer at the first speaker 30, as controlled by the control circuit 120 (FIG. 1).

Analog audio received at the microphone(s) 80 is also processed at the first speaker 30. As shown, this analog audio is converted (analog-to-digital conversion) and encoded as controlled by the control circuit 120 (FIG. 1). The encoding is done by the DSP 706, and then the firmware 704 fetches the encoded SCO packets, where it is sent to the audio gateway 20 over the SCO link established by the HFP connection 150.

Figure 8:
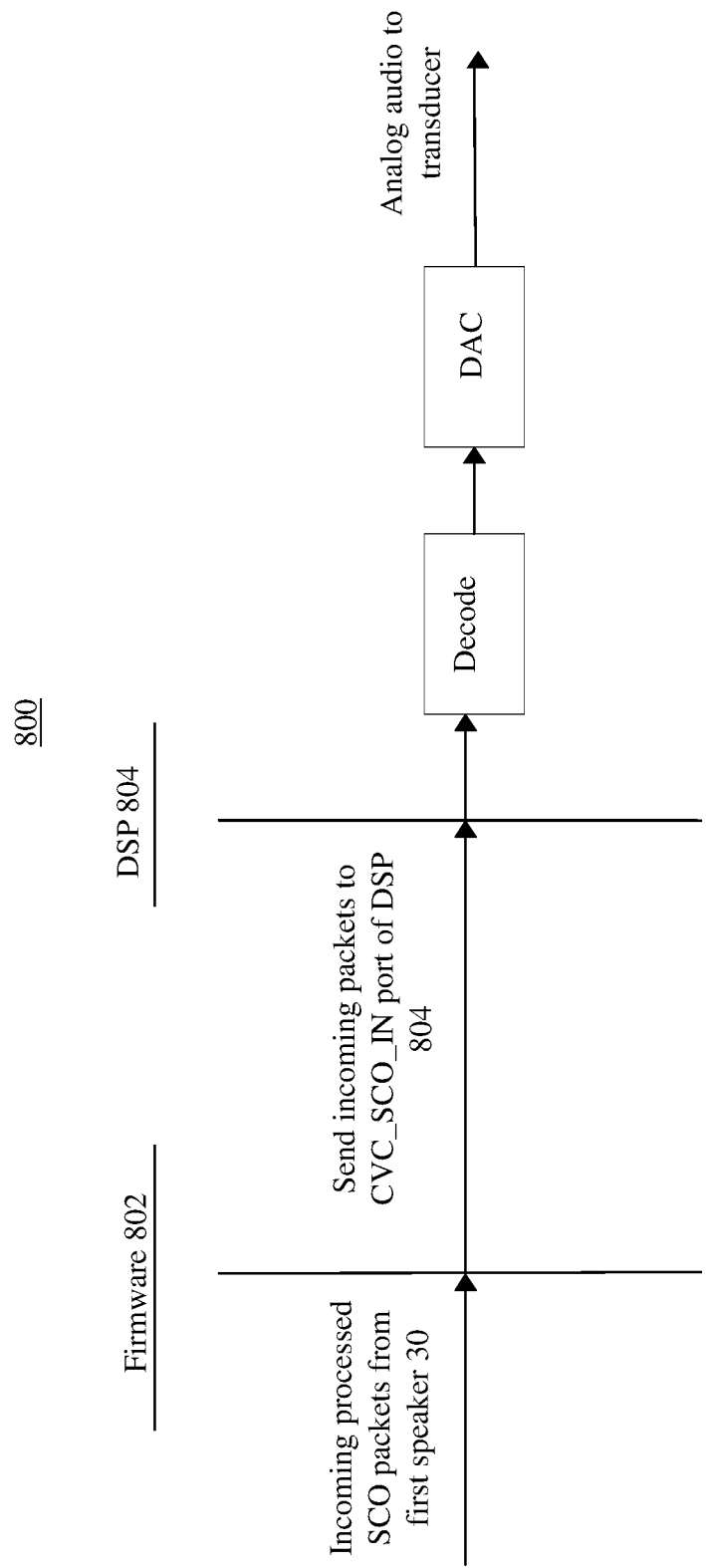
FIG. 8 is an example data flow diagram illustrating data paths at the second speaker relative to the first speaker in the wireless audio system of FIG. 1.

FIG. 8 is an example data flow diagram 800 illustrating data paths in playing audio at the second speaker 40 (secondary speaker) relative to the first speaker 30, as a continuation of FIG. 7. It is understood that this data flow diagram does not illustrate sending call audio back to first speaker 40, however, as noted herein, various implementations can include sending call audio received at second speaker 40 back to audio gateway 20 via first speaker 30. That is, the data flow diagrams in FIGS. 7 and 8 are intended to depict only the single-microphone example configuration of wireless audio system 10. It is understood that second speaker 40 could receive and process call audio from its microphone(s) 90 in a manner similar to first speaker 30, e.g., as shown in FIG. 7.

Returning to FIG. 8, as shown, second speaker 40 receives incoming SCO packets from the first speaker 30 over the SCO link established by the SVFP connection 140. Firmware 802 at the second speaker 40 streams the encoded SCO packets to the IN port of the DSP 804 (in control circuit 130). Additionally, the raw SCO packets received at the IN port of the DSP 804 are decoded and converted (digital-to-analog conversion) to provide analog audio to the transducer at the second speaker 40, as controlled by the control circuit 120 (FIG. 1).

As described herein, the wireless audio system 10 is configured to forward call audio from a first wireless transceiver to a second wireless transceiver and exchange call control data with the second wireless transceiver over a simple voice forward profile (SVFP) connection. This SVFP connection can provide mechanisms for effective delay control, synchronization, and customization of connections between the transceivers when compared with conventional approaches.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, unless otherwise noted, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

The invention claimed is:

1. A wireless audio system comprising:
a first wireless transceiver configured to establish a wireless link with an audio gateway for receiving and sending call audio and exchanging call control data;
a second wireless transceiver configured to wirelessly communicate with the first wireless transceiver over a simple voice forward profile (SVFP) connection; and
a headphone system comprising a first headphone containing the first wireless transceiver and a second headphone containing the second wireless transceiver,
wherein the first wireless transceiver is configured to forward the call audio to the second wireless transceiver and exchange the call control data with the second wireless transceiver over the SVFP connection,
wherein the first headphone further comprises at least one first microphone and the second headphone further comprises at least one second microphone,
wherein the second wireless transceiver is configured to send call audio received at the at least one second microphone to the first wireless transceiver over a synchronous connection-orientated (SCO) link established by the SVFP connection, and wherein the first wireless transceiver is configured to send the call audio received from the second wireless transceiver to the audio gateway over a synchronous connection-orientated (SCO) link established by a hands-free profile (HFP) connection.

2. The wireless audio system of claim 1, wherein the first headphone and the second headphone are configured to disable an on-ear detection operating mode during receipt or transmission of the call audio.

3. The wireless audio system of claim 1, wherein the SVFP connection permits the call audio and the call control data to travel exclusively over the SVFP connection between the first wireless transceiver and the second wireless transceiver, and
wherein the SVFP connection permits control of delay in playing the call audio by a digital signal processor (DSP) in at least one of the first headphone or the second headphone.

4. The wireless audio system of claim 3, wherein the delay in playing the call audio by the DSP permits synchronization of playing the call audio by the DSP in the first headphone and the DSP in the second headphone.

5. The wireless audio system of claim 1, further comprising:
an audio conference system paired with a headphone system, wherein the first wireless transceiver is contained in the audio conference system and the second wireless transceiver is contained in the headphone system.

6. The wireless audio system of claim 1, wherein the wireless link between the first wireless transceiver and the audio gateway, and a SVFP connection between the first wireless transceiver and the second wireless transceiver, are over Bluetooth.

7. A computer-implemented method of controlling a wireless audio system comprising a first wireless transceiver, a second wireless transceiver and an audio gateway configured to send and receive call audio, and exchange call control data, over a wireless link between the first wireless transceiver and the audio gateway, the method comprising:
establishing a simple voice forward profile (SVFP) connection between the first wireless transceiver and the second wireless transceiver; and
forwarding, from the first wireless transceiver, the call audio received from the audio gateway to the second wireless transceiver over a synchronous connection-oriented (SCO) link established by the SVFP connection,
wherein a service discovery protocol (SDP) server at the second wireless transceiver has a service record with generic audio as a major service class and simple voice forward or a similar unique name as a minor service class, and specifies a custom universally unique identifier (UUID) on a service class identification (ID) list, forming a custom Bluetooth profile for the SVFP connection, and
wherein the SVFP connection is initiated by the first wireless transceiver by sending an SDP query to the second wireless transceiver with the custom UUID as a parameter, and upon receipt of the SDP query, the second wireless transceiver responds positively with an SDP response with a dedicated radio frequency communication (RFCOMM) channel number as a parameter.

8. The computer-implemented method of claim 7, wherein the SVFP connection is established in response to a hands-free profile (HFP) connection being established between the audio gateway and the first wireless transceiver, the method further comprising:
exchanging the call control data between the first wireless transceiver and the second wireless transceiver over the RFCOMM channel established by the SVFP connection.

9. The computer-implemented method of claim 7, wherein forwarding the call audio to the second wireless transceiver and exchanging the call control data with the second wireless transceiver over the SVFP connection does not involve a hands free profile (HFP) connection between the first wireless transceiver and the second wireless transceiver.

10. The computer-implemented method of claim 9, wherein the SVFP connection permits the call audio and the call control data to travel exclusively over the SVFP connection, and
wherein the SVFP connection permits control of delay in playing the call audio by a digital signal processing (DSP) coupled with at least one of the first wireless transceiver or the second wireless transceiver.

11. The computer-implemented method of claim 10, wherein the delay in playing the call audio by the DSP permits synchronization of playing the call audio by the DSP coupled with the first wireless transceiver and the DSP coupled with the second wireless transceiver.

12. The computer-implemented method of claim 10, wherein control of the delay comprises exchanging delay information within call control data over the RFCOMM channel established by the SVFP connection between the first wireless transceiver and the second wireless transceiver.

13. A wireless headphone system comprising:
a first headphone comprising:
at least one first microphone; and
a first wireless transceiver connected with the at least one first microphone and configured to establish a wireless link with an audio gateway for receiving and sending call audio; and
a second headphone comprising:
at least one second microphone; and
a second wireless transceiver connected with the at least one second microphone and configured to wirelessly communicate with the first wireless transceiver over a simple voice forward profile (SVFP) connection,
wherein the first wireless transceiver is configured to forward the call audio to the second wireless transceiver over the SVFP connection,
wherein the SVFP connection comprises a dedicated radio frequency communication (RFCOMM) channel and a dedicated synchronous connection orientated (SCO) link between the first wireless transceiver and the second wireless transceiver, and
wherein the call audio received at the first wireless transceiver from the audio gateway is forwarded to the second wireless transceiver over the SCO link established by the SVFP connection between the first wireless transceiver and the second wireless transceiver.

14. The wireless headphone system of claim 13, wherein the first headphone and the second headphone are configured to disable an on-ear detection operating mode during receipt or transmission of the call audio.

* * * * *